Dec. 23, 1958  B. D. SLATER  2,866,175
MOTOR VEHICLE SIGNALLING SYSTEM
Filed Aug. 22, 1955

INVENTOR
Benjamin D. Slater
BY Robert M. Dunning
ATTORNEY

United States Patent Office 2,866,175
Patented Dec. 23, 1958

2,866,175

MOTOR VEHICLE SIGNALLING SYSTEM

Benjamin D. Slater, St. Paul, Minn.

Application August 22, 1955, Serial No. 529,643

1 Claim. (Cl. 340—74)

This invention relates to a motor vehicle signalling system. More particularly, the invention concerns an improved combination of a parking signal, directional parking and turn signal and back-up lights in conjunction with the controls therefor.

In the present day system of highly specialized mechanical and automatic lighting devices for signal indications on automotive vehicles there is generally provided only the usual right and left turn signals operated by a steering wheel mounting and a back-up light signal generally operated by the shifting of the gears into reverse. Apart from these items there is always provided an automatic brake signal, which, while indicating a warning, does not always foretell whether the signal is for a stop or merely an indication for slowing down to make a turn. Thus it will be recognized, as is often times the case, the driver behind is many times left in doubt as to what the preceding vehicle driver intends ot do. That is, on a crowded street the driver behind is oftentimes left in doubt as to what the driver in front intends to do with regards to parking, turning, slowing down or making a complete stop to park. Therefore, it is recognized there is still need for improvement in vehicular signal devices.

It is therefore an object of this improvement to provide in combination a parking signal and direction indicators therefor.

It is another object of this improvement in vehicular signalling devices to provide in combination a directional signal indication, directional parking indicator and back-up light arrangement including circuit systems therefore for combined and independent operation.

A further object of this improvement in vehicle signaling is to provide the traffic with a parking signal in combination with a directional right and left turn blinker signal, and circuits therefor, which when used with or without a brake signal gives advance warning as to the intention of the signaling driver.

Another object of this improvement is to provide a vehicle signaling arrangement wherein the signaling operator can simultaneously forewarn the driver behind that not only are the brakes applied to show a stop but that the signaling driver is ready to back up and that he intends to park either on the right or left hand side in accordance with an indicated directional blinker signal.

Further objects and advantages will be apparent from the following description of the accompanying drawings wherein.

Figure 1:
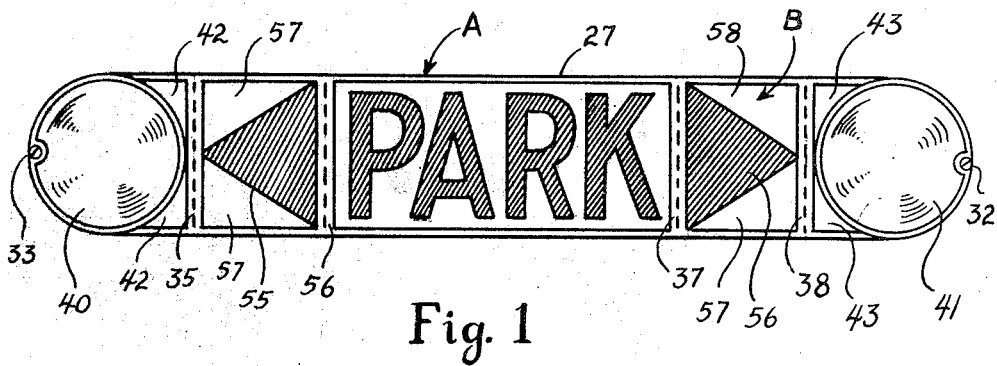
Figure 1 is a front plan view of my improved combination of parking and signaling device.

With reference to the drawings, the housing A is a prefabricated stamped metal unit upon which is mounted a transparent facing B. This housing 8 may be formed of prefabricated plastic, if desired.

The prefabricated metal housing is provided with a top wall 10, a bottom wall 11 and integral rounded end walls 12 and 13. A back wall 14 is provided, for example, as a fold portion of wall 10 and secured to wall 11 and end walls 12 and 13 by spot welding to close the back side of the housing A. The housing A is divided into chambered sections by the partition walls 15, 16, 17 and 18. These partition walls are spot welded, or otherwise secured, to the back wall 14 and between the upper wall 10 and bottom wall 11. Centered within the chambers formed by the walls 15, 16, 17 and 18 are a plurality of single contact light bulbs 19, 20, 21, 22, 23 and 24. The light bulbs, as indicated, are secured to single contact mountings of a conventional character, not shown, which are secured in a conventional manner to wire mounting apertures in the back wall 14 (not shown).

Figure 2:
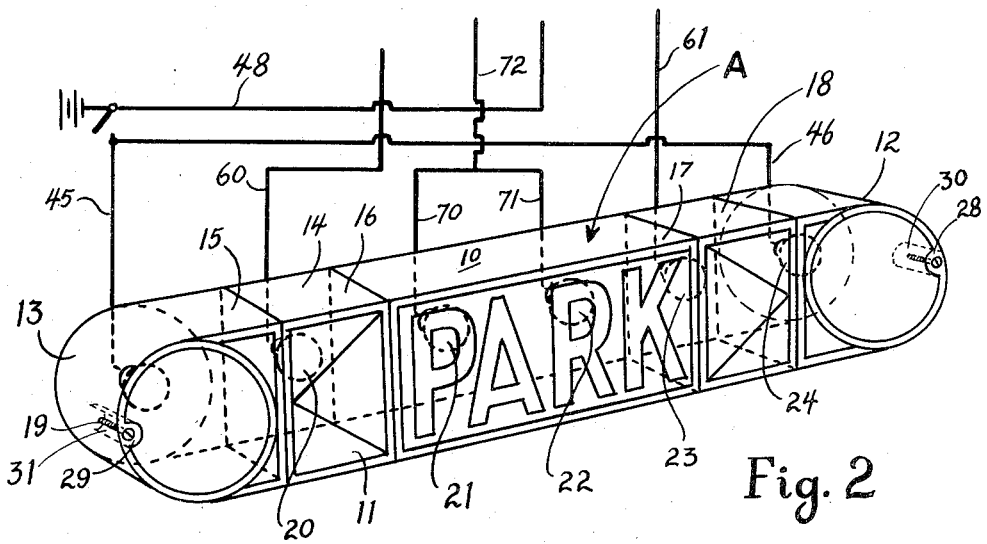
Figure 2 is a perspective of my combined parking and direction motor vehicle signaling device.
Figure 3:
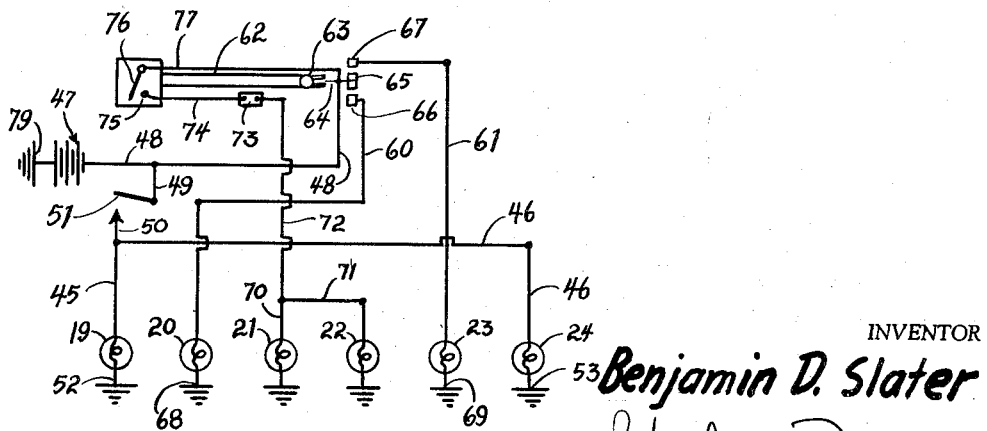
Figure 3 is a diagrammatic plan view of a circuit control system for the structure shown in Figures 1 and 2.

The face plate, or transparent portion B, is shaped to fit against the front edge section formed by the metal cabinet walls 10, 11, 12 and 13. A metal or plastic holding ring 27 engages the edges of the plate B and holds it in substantially sealed relationship to the housing A. The holding rim 27 is provided with ears 28 and 29 turned inwardly centrally of the rounded end sections which bear against the walls 12 and 13. Suitable thickened wall portions 30 and 31 are formed along the inner surface of the wall sections 12 and 13, respectively. These wall portions 30 and 31 are provided with apertures into which the fastening screws 32 and 33 are turned, respectively. As illustrated in Figures 1 and 2, the screws 32 and 33 are mounted through the ears 28 and 29 and turned into the enlargements 30 and 31, respectively. The enlargements 30 and 31 are representative of flanges or other fastening means for securing the threads of screw fastening means 32 and 33 which mount rim 27 to the housing A and hold plate B in relatively tight relationship therewith.

At spaced intervals and extending between the parallel sides of frame 27 are a number of integral cross pieces or ribs 35, 36, 37 and 38 which exactly coincide with the spacing of the partition members 15, 16, 17 and 18, respectively. These ribs 35, 36, 37 and 38 in conjunction with the partition walls, as indicated, serve to make the chambered spaces therebetween stand out as separate sections within the indicated walls of the housing A.

The facing plate B, as illustrated, is glass but may be formed of plastic, is also divided into equally spaced sections coinciding with the chambered spaces between the walls of housing A and the partition members 15, 16, 17 and 18. The relative rounded ends 40 and 41 are clear transparent plain or embossed circles with chromed or blocked out side areas 42 and 43, respectively. The circular sections of the plate B serve to provide back-up lights and signal therefor. These back-up light sections are provided by chambered portions of housing A formed between the end walls 12 and 13 with related portions of the walls 10, 11 and 14 extending to the portion walls 18 and 15, respectively. The light bulbs 19 and 24 serve to provide back-up light illumination when the lead-in conductors 45 and 46 are connected to the battery 47 through conductors 48, 49 and 50 by switch 51. The switch 51 may be actuated by hand but preferably is operated in the conventional manner by the reverse gear mechanism of an automobile. To complete the single lead-in contact circuit the conductor 45 is grounded at 52 and the conductor 46 is grounded at 53. Switch arm 51 may, in addition, be representative of a combined dashboard mounted hand lighting and/or reverse gear lighting back-up signal switch.

Adjacent the back-up light sections the facing plate B is provided with directional parking and turning red arrow pointing sections 55 and 56. The portions 57 of plate B are chromed or blocked out to emphasize the directional blinker pointing by the arrows 55 and 56 respectively. The light bulbs 20 and 23 for lighting the directional arrows 55 and 56, respectively, are enclosed by the wall portions 10, 11 and 14 between partition members 15 and 16, and 17 and 18, respectively. These bulbs 20 and 23 are in circuit with the battery 47 and its current feed conductor 48 through lead-in conductors 60 and 61 when a conventional hand signal switch handle 62 is actuated for a right or left turn. The end 63 of handle 62, which is attached to steering wheel in a conventional manner, serves to throw switch arm 64 up or down. Switch arm 64 is connected to battery conductor cable 48 and moves a switch contact 65 into circuit making and breaking relationship with conventional blinker and turn-righting cut out contacts 66 and 67. The switch contacts 66 and 67 are in circuit with lead-in conductors 60 and 61 respectively for indicating a right hand side parking and/or turning signal or a left hand parking and/or turning signal as herein provided. To complete the single circuit the bulbs 20 and 23 are grounded at 68 and 69, respectively. This circuit system may or may not be connected with front turn signal lights (not shown).

Centered between the ribs 36 and 37 the elongated plate B is provided with the large lettering "Park" which preferably is designed in red coloring similar to the coloring of the arrow indicators 55 and 56. The associated or adjacent glass portion 77 is chrome colored or blocked out to make the lettering outstanding when lighted by the bulbs 21 and 22. These bulbs are enclosed by the chamber section formed by walls 10, 11 and 14 enclosed by partitions 16 and 17 forming end walls therefor. A lighting circuit for operation of the park signal with or without associated use of the directional signals 55 and 56 and the back-up signals 40 and 41 is provided by lead-in conductors 70 and 71, connected through conductor 72 to a blinker 73 and conductor 74 to switch contact 75 on the one side. On the other side of the circuit is completed by hand operation of switch arm 76, on the end of handle 62, connected by conductor 77 to battery conductor 48. As illustrated, the circuit systems are single contact, fed by battery 47 which is grounded as at 79.

In lighting the "Park" signal lights 21 and 22 through hand operation of switch arm 76, there is provided an arrangement which permits the driver to signal a positive indication of stopping in conjunction with his brake lights and also a turn in signal as to which side the parking is to take place. Oftentimes as on a one way street when traffic is heavy left hand side parking is necessary. Otherwise, on a crowded two way street the "Park" signal gives a definite warning that the vehicle displaying the signal is making a stop to park or indicate a turn into a parking lot usually having a turn-in somewhere along the block length other than at the corner. If a corner turn is to be made it can be indicated by the turn signal without operation of the "Park" signal circuit. In backing up the combination of "Park," blinking directional and back-up signals clearly indicate what the signaling vehicle is doing or intends doing. Similarly a foremost car can signal an intent to stop and park by using the brake lights, park lights and directional lights.

In accordance with the patent statutes, I have described the principles of construction and operation of my combination directional park signal, and while I have endeavored to set forth the best embodiment thereof, I desire to have it understood that changes may be made within the scope of the following claim without departing from the spirit of my invention.

I claim:

A motor vehicle signaling system comprising a plate bearing the word "park" thereon, means for illuminating said plate and thereby rendering said word "park" clearly visible, left turning signaling means closely adjacent the left side of the word "park," means for illuminating said left turning means, right turning signaling means closely adjacent the right side of said word "park," means for illuminating said right turning means, an elongated handle movable in either of two directions for causing selective energization of either the illuminating means for said left turning means or the illuminating means for said right turning means, and independent switch means carried at the free end of said handle for energizing said "park" illuminating means irrespective of whether said handle has been moved in either of said directions.

References Cited in the file of this patent

UNITED STATES PATENTS

| D. 81,939 | Rainey | Sept. 2, 1930 |
| 1,640,275 | Hitchcock | Aug. 23, 1927 |
| 1,730,975 | Jacobson | Oct. 8, 1929 |
| 1,761,519 | Currlin | June 3, 1930 |
| 1,969,116 | Bobroff | Aug. 7, 1934 |
| 2,186,911 | Erickson | June 9, 1940 |
| 2,652,553 | Hollins | Sept. 15, 1953 |

FOREIGN PATENTS

| 286,305 | Switzerland | Oct. 15, 1952 |
| 632,580 | France | Oct. 10, 1927 |